(12) United States Patent
Hattori et al.

(10) Patent No.: US 8,876,116 B2
(45) Date of Patent: Nov. 4, 2014

(54) SEALING STRUCTURE

(75) Inventors: Yuji Hattori, Gotenba (JP); Kenta Kimura, Susono (JP); Takafumi Inagaki, Susono (JP); Tomokazu Inagawa, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/375,398

(22) PCT Filed: Apr. 20, 2011

(86) PCT No.: PCT/JP2011/059693
§ 371 (c)(1),
(2), (4) Date: Nov. 30, 2011

(87) PCT Pub. No.: WO2012/144024
PCT Pub. Date: Oct. 26, 2012

(65) Prior Publication Data
US 2014/0035237 A1    Feb. 6, 2014

(51) Int. Cl.
 *F16J 9/14* (2006.01)
 *F16J 15/34* (2006.01)
 *F16J 15/32* (2006.01)
 *F16D 25/0638* (2006.01)
 *F16J 9/00* (2006.01)

(52) U.S. Cl.
CPC ........... *F16J 15/3404* (2013.01); *F16J 9/14* (2013.01); *F16J 9/00* (2013.01); *F16J 15/3272* (2013.01); *F16D 25/0638* (2013.01); *F16D 2300/08* (2013.01)
USPC ...................................................... 277/496

(58) Field of Classification Search
CPC .................... F16J 9/00; F16J 9/14; F16J 9/12

USPC ..................................... 277/422, 496–499
See application file for complete search history.

(56) References Cited

U.S. PATENT DOCUMENTS 1,369,104 A * 2/1921 Hendrickson ................. 277/497
3,655,208 A * 4/1972 Walker ........................ 277/496
4,189,161 A * 2/1980 Grimm ....................... 277/496

(Continued)

FOREIGN PATENT DOCUMENTS

JP    03-017471 U   2/1991
JP    06-281007     10/1994

(Continued)

OTHER PUBLICATIONS

Engineers Handbook of Piston Rings, Seal Rings, Mechanical Shaft Seals; Koppers Company, Inc., 9, pp. 1, 2, 48-51, 54, 55, 70, and 71, Edition 1975, USA.

(Continued)

*Primary Examiner* — Vishal Patel
(74) *Attorney, Agent, or Firm* — Sughrue Mion, PLLC

(57) ABSTRACT

A sealing structure capable of reducing oil leakage while preventing the oil from being deteriorated by a temperature rise of the oil.

The sealing structure is configured to seal a clearance between two members tightly by a seal ring interposed therebetween. The seal ring is provided with a slidable structure, which is configured to seal the clearance between the two members by a hydraulic pressure applied thereto, and to unseal the clearance between the two members by a relative movement thereof resulting from a thermal expansion thereof.

8 Claims, 4 Drawing Sheets

(56) References Cited

U.S. PATENT DOCUMENTS

| | | | | |
|---|---|---|---|---|
| 4,468,041 | A | * | 8/1984 | Yoshimura et al. ........... 277/584 |
| 5,071,142 | A | * | 12/1991 | Rehfeld ........................ 277/468 |
| 5,713,578 | A | | 2/1998 | Terao et al. |
| 2006/0133706 | A1 | | 6/2006 | Okada et al. |
| 2007/0052181 | A1 | * | 3/2007 | Nakamura .................... 277/584 |
| 2009/0322037 | A1 | * | 12/2009 | Kondo et al. ................. 277/500 |

FOREIGN PATENT DOCUMENTS

| | | |
|---|---|---|
| JP | 08-135797 A | 5/1996 |
| JP | 08-338538 A | 12/1996 |
| JP | 09-159026 | 6/1997 |
| JP | 2005-016714 A | 1/2005 |
| WO | WO 2010/021218 A1 | 2/2010 |

OTHER PUBLICATIONS

Office Action in corresponding Japanese Patent Application No. 2011-549375 dated Sep. 25, 2012.

* cited by examiner

SEALING STRUCTURE

CROSS REFERENCE TO RELATED APPLICATIONS

This application is a National Stage of International Application No. PCT/JP2011/059693 filed Apr. 20, 2011, the contents of all of which are incorporated herein by reference in their entirety.

TECHNICAL FIELD

The present invention relates to a sealing structure for sealing a clearance between two members liquid-tightly or air-tightly by a seal ring interposed therebetween.

BACKGROUND ART

A conventional belt-type continuously variable transmission is configured to change a speed change ratio and a torque capacity by varying an oil pressure or an oil amount applied to a hydraulic actuator. In case the belt-type continuously variable transmission thus structured is used in a vehicle, oil reserved in an oil pan is pumped up by an oil pump driven by a prime mover of the vehicle, and fed to the hydraulic actuator while being pressurized. In this situation, if the oil leaks from the belt-type continuously variable transmission, the oil pump has to be driven unnecessarily to feed the oil to the hydraulic actuator thereby compensating the leaking oil. In this case, therefore, a fuel economy of the vehicle is deteriorated by thus driving the oil pump more than necessary.

For example, international publication WO 2010/021218 discloses a hydraulic control device capable of reducing oil leakage from a control valve for feeding and discharging oil to/from a belt-type continuously variable transmission. Specifically, according to the teachings of WO 2010/021218, each pulley of the belt-type continuously variable transmission is connected with electromagnetic poppet valves capable of reducing oil leakage, and those valves are opened in case of maintaining an oil pressure or an oil amount applied to the pulleys.

As described, the oil reserved in the oil pan is supplied to the hydraulic actuator. However, the oil reserved in the oil pan is mixed with the oil returned to the oil pan after lubricating another frictional portion. Therefore, abrasion powder or the like is contained in the oil supplied from the oil pan to the hydraulic actuator. In order to avoid the above-explained disadvantage, Japanese Patent Laid-Open No. 8-135797 discloses a seal ring configured to discharge foreign particle while leaking a given amount of oil. Specifically, according to the teachings of Japanese Patent Laid-Open No. 8-135797, a sectional area of a flow path will not be changed even if the seal ring is thermally expanded due to a rise in the oil temperature. Therefore, the seal ring taught by Japanese Patent Laid-Open No. 8-135797 is capable of discharging the oil at a constant rate.

Thus, frequency in use of the oil pump used in the belt-type continuously variable transmission can be reduced by preventing an occurrence of the oil leakage from the hydraulic actuator as taught by WO 2010/021218. However, if the oil is sealed in the hydraulic actuator to stabilize the speed change ratio or the torque capacity, the temperature of the oil in the hydraulic actuator has to be raised and this may cause deterioration of the oil.

DISCLOSURE OF THE INVENTION

The present invention has been conceived noting the technical problems thus far described, and an object of the present invention is to provide a sealing structure capable of preventing an oil leakage from a portion to which the oil is supplied while preventing the oil from being deteriorated by a temperature rise.

In order to achieve the above-mentioned object, according to the present invention, there is provided a sealing structure for sealing a clearance between two members liquid-tightly or air-tightly by a seal ring interposed therebetween. According to the present invention, the seal ring comprises a slidable structure, which is configured to seal the clearance between the two members by a hydraulic pressure applied thereto, and to unseal the clearance between the two members by a relative movement thereof resulting from a thermal expansion thereof.

According to the present invention, specifically, the slidable structure comprises a pair of slidable pieces arranged adjacent to each other in a width direction of the seal ring while being allowed to slide relatively in counter directions, and a guiding structure, which is configured to guide one of the slidable pieces in a direction away from the other slidable piece when the slidable pieces move ahead relatively as a result of thermal expansion of the seal ring. In addition, the aforementioned seal ring further comprises an opening which is opened between the slidable pieces when said one of the slidable pieces is isolated away from the other slidable piece.

More specifically, according to the present invention, the aforementioned guiding structure comprises an inclined face formed on a leading end of said one of the slidable piece and an inclined receiving face formed to be opposed to the inclined face, thereby producing an outward component of a pushing force between the inclined face and the inclined receiving face resulting from the thermal expansion of the seal ring in a width direction of the seal ring.

According to the present invention, the sealing structure further comprises a groove formed on one of the two members to hold the seal ring therein, and the clearance between the two members is sealed by contacting the seal ring held in the groove with the other member while pushing the seal ring onto one of inner faces of the groove by a hydraulic pressure.

According to the present invention, the seal ring is configured to seal the clearance between the two members by being contacted with each of the two members, and the slidable structure is configured to create a clearance by partially isolating the seal ring from said one of two members.

In addition, according to the sealing structure of the present invention, a distance of a clearance between a leading end face of said other slidable piece and a face opposed thereto is determined not to contact those faces even when the inclined face and the inclined receiving face are contacted to each other.

Thus, according to the present invention, the clearance between the two members can be sealed liquid-tightly or air-tightly by the seal ring interposed therebetween. As described, the seal ring is provided with the slidable structure configured to be closed when subjected to the hydraulic pressure. Therefore, the clearance between those two members can be sealed by the pressure of fluid existing therebetween. As also described, the slidable structure is configured to be opened when the seal ring is thermally elongated. Therefore, the fluid can be discharged from the seal ring in case the seal ring is thermally expanded by the temperature of the fluid interposed between those two members. For this reason, the temperature of the fluid will not be raised excessively.

As also described, the slidable structure comprises the pair of slidable pieces arranged adjacent to each other in the width direction of the seal ring while being allowed to slide relatively in counter directions, and the guiding structure, which is configured to guide one of the slidable pieces in a direction away from the other slidable piece when said one of the slidable piece moves ahead as a result of thermal elongation of the seal ring. In addition, the seal ring further comprises the opening which is opened between the slidable pieces when said one of the slidable pieces is isolated away from the other slidable piece. Therefore, the clearance between the two members can be unsealed by isolating the slidable pieces depending on a thermal condition.

In addition, the guiding structure comprises the inclined face formed on the leading end of said one of the slidable piece and the inclined receiving face formed to be opposed to the inclined face. Therefore, an outward component of the pushing force between the inclined face and the inclined receiving face resulting from the thermal elongation of the seal ring is produced by the guiding structure in the width direction of the seal ring. For this reason, the clearance between the two members can be unsealed when the seal ring is expanded thermally and the inclined face and the inclined receiving face are thereby contacted with each other.

As also described, the sealing structure further comprises the groove formed on one of the two members to hold the seal ring therein. According to the present invention, specifically, the clearance between the two members can be sealed by contacting the seal ring with the other member and by pushing the seal ring onto one of the inner faces of the groove by a hydraulic pressure.

As also described, the seal ring is configured to seal the clearance between the two members by being contacted with each of the two members, and the slidable structure is configured to create a clearance by isolating a portion of the seal ring from said one of two members. Therefore, the clearance between the two members can be unsealed by thus creating the clearance between the seal ring and the said one of two members.

In addition to the above advantages, according to the present invention, the distance of the clearance between the leading end face of said other slidable piece and the face opposed thereto is maintained sufficiently in order not to contact those faces even when the inclined face and the inclined receiving face are contacted to each other. Therefore, the fluid can be discharged from the clearance between those faces so that the clearance between the two members can be unsealed.

BEST MODE FOR CARRYING OUT THE INVENTION

Figure 8:
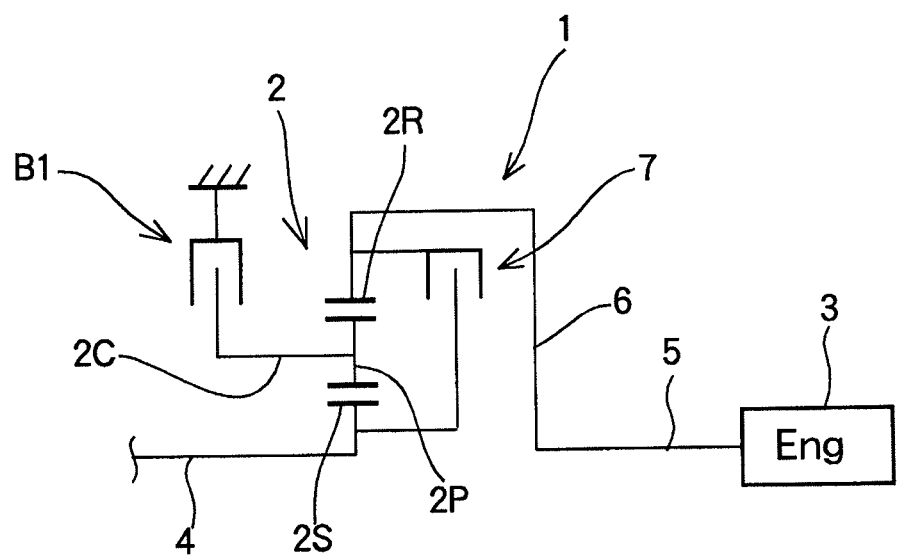
FIG. 8 is a view schematically showing a torque reversing mechanism to which the sealing structure of the present invention is applied.

Next, the present invention will be explained in more details. First of all, a structure of a torque reversing mechanism 1 used in a vehicle will be explained briefly with reference to FIG. 8. As schematically shown in FIG. 8, the torque reversing mechanism 1 is composed mainly of a conventional planetary gear mechanism 2. Specifically, the torque reversing mechanism 1 is configured to reverse a rotational direction of the torque inputted from an engine 3. For this purpose, the planetary gear mechanism 2 is provided with: a ring gear 2R as an internal gear; a sun gear 2S arranged coaxially with the ring gear 2R and integrated with an output shaft 4; a plurality of pinion gears 2P allowed to rotate together with the gears 2R and 2S meshing therewith, while revolving around a rotational axis of the ring gear 2R; and a carrier 2C holding the pinion gears 2P in a rotatable manner.

The engine 3 is connected with an input shaft 5 configured to input the torque transmitted thereto from the engine 3 to the torque reversing mechanism 1, and a housing 6 is connected with the input shaft 5 in a manner to be rotated integrally therewith. The housing 6 is connected with the ring gear 2R. That is, the ring gear 2R serves as an input element of the planetary gear mechanism 2. In order to reverse the torque inputted to the planetary gear mechanism 2, the carrier 2C is connected with a brake B1. Therefore, the rotational direction of the sun gear 2S is revered by restricting the revolution of the pinion gear 2P by activating the brake B1. Here, a conventional brake is used as the brake B1 in the example shown in FIG. 8. Thus, the power of the engine 3 can be outputted while changing the rotational direction of the sun gear 2S by selectively halting the rotation of the carrier 2C. That is, a traveling direction of the vehicle can be switched.

Figure 9:
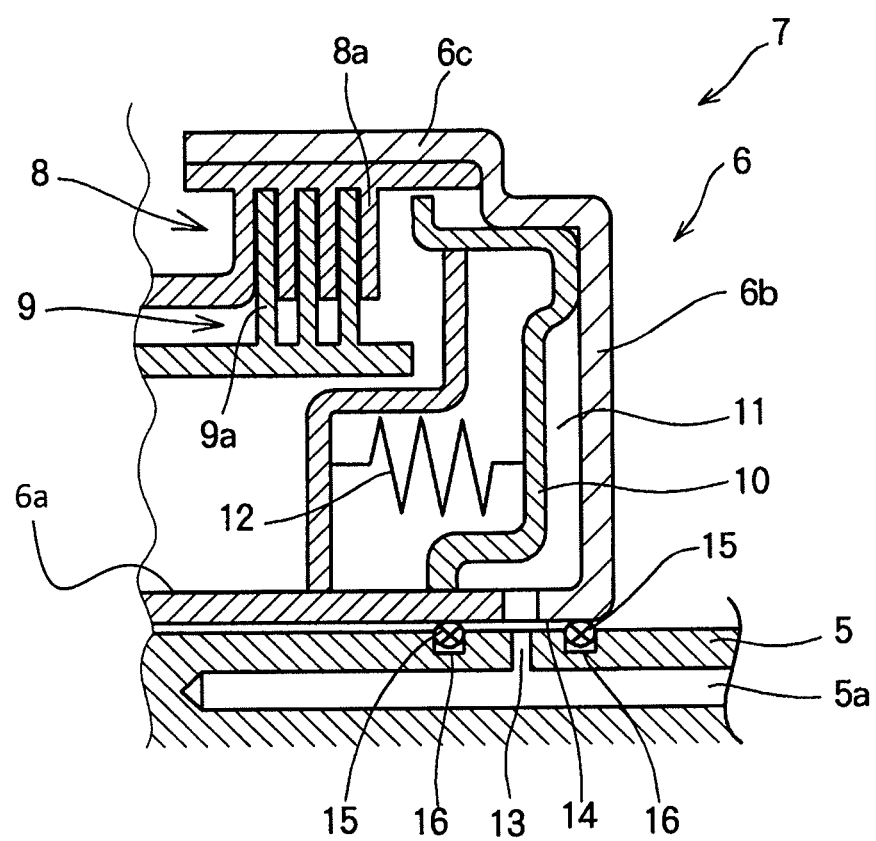
FIG. 9 is a sectional view showing a cross-section of a clutch mechanism of the torque reversing mechanism.

In case of driving the vehicle in the forward direction, the power of the engine 3 is outputted by rotating the input shaft 4 and the output shaft 5 in the same direction without changing the rotational speed of the input shaft 5. For this purpose, according to the example shown in FIG. 8, the torque reversing mechanism 1 is provided with a clutch mechanism 7 adapted to rotate the ring gear 2R and the sun gear 2S integrally. A structure of the clutch mechanism 7 will be explained in more details with reference to FIG. 9. As shown in FIG. 9, the aforementioned housing 6 comprises: a cylindrical portion 6a formed around an outer circumferential face of the input shaft 5; a side wall 6b formed by bending the cylindrical portion 6a outwardly at an end portion of an input side, that is, at the right end in FIG. 9; and an outer circumferential wall 6c formed by bending the side wall 6b at an outer circumferential end toward an output side in an axial direction, that is, toward the left side in FIG. 9. The cylindrical portion 6a is engaged with the input shaft 5 by a not shown fixing member, or welded with the input shaft 5.

An engagement member 8 is attached to the outer circumferential wall 6c. Specifically, the engagement member 8 is formed integrally with the ring gear 2R, and the engagement member 8 comprises a plurality of plates 8a juxtaposed in the axial direction at regular intervals. Meanwhile, another engagement member 9 is formed integrally with the sun gear 2S. Specifically, the engagement member 9 comprises another plurality of plates 9a, and each plate 9a is inserted into a clearance between the plates 8a. In addition, a piston 10 is arranged between the cylindrical portion 6a and the outer circumferential wall 6c while keeping a predetermined distance from the side wall 6b, and the piston 10 is allowed to reciprocate axially on the outer circumferential face of the cylindrical portion 6a. Specifically, the piston 10 is configured to push the engagement member 8 of the ring gear 2 in the axial direction. For this purpose, the piston 10 is bent at its radialy outer portion toward the engagement member 8, that is, toward the output side in the axial direction. In order to push the piston 10 in the axial direction, a hydraulic pressure is applied to a clearance between the side wall 6a of the housing 6 and the piston 10. Therefore, a load applied to the piston 10 is changed according to the hydraulic pressure applied to the aforementioned clearance. Thus, the clearance between the side wall 6a and the piston 10 serves as a hydraulic chamber 11, and a pushing force for pushing the engagement member 8 of the ring gear 2R is controlled by controlling the hydraulic pressure in the hydraulic chamber 11. In addition, in order to return the piston 10 toward the input side, a return sprig 12 is arranged in the left side of the piston 10. Therefore, the piston 10 is always pushed toward the right side in FIG. 9 by an elastic force of the spring 12.

In case of driving the vehicle in the forward direction, in the clutch mechanism 7 thus structured, the engagement member 8 of the ring gear 2R is engaged frictionally with the engagement member 9 of the sun gear 2S by boosting the hydraulic pressure in the hydraulic chamber 11 thereby increasing the pushing force pushing the engagement member 8. As a result, the ring gear 2R and the sun gear 2S are rotated integrally, that is, the output shaft 4 is rotated in the same direction as the rotational direction of the input shaft 5. Here, the vehicle is driven in the forward direction in most situations rather than driven in the backward direction. Therefore, the hydraulic pressure in the hydraulic chamber 11 is kept to a high pressure in most situations.

Next, here will be explained a hydraulic circuit for feeding the oil to the hydraulic chamber 11. The aforementioned input shaft 5 is a cylindrical member in which a hollow portion 5a is formed along the rotational axis thereof, and the hollow portion 5a is connected with an oil pump not shown. In addition, a flow path 13 opening toward the hydraulic chamber 11 is formed to connect the hollow portion 5a with the outer circumferential side of the input shaft 5. Therefore, the oil discharged from the oil pump is allowed to be fed to the hydraulic chamber 11 through the hollow portion 5a of the input shaft 5.

The housing 6 is configured to hold the input shaft 5 inserted into the cylindrical portion 6a thereof, and after the input shaft 5 is inserted into the cylindrical portion 6a, a clearance 14 remains necessarily between an inner circumferential face of the cylindrical portion 6a and the outer circumferential face of the input shaft 5. For this reason, the oil being supplied to the hydraulic chamber 11 may leaks from the clearance 14 to outside. Therefore, in case of increasing the oil pressure in the hydraulic chamber 11, or in case of keeping the oil pressure in the hydraulic chamber 11 at a constant level, it is necessary to compensate the oil thus leaking from the clearance 14 by feeding the oil to the hydraulic chamber 11 more than necessary. In addition, in case the pressure in the hydraulic chamber 11 is kept at a constant level, the oil is not allowed to flow. In this situation, the temperature of the oil is raised and the oil is thereby deteriorated. Therefore, in order to avoid those disadvantages, seal sings 15 are fitted onto the input shaft 5 on both sides of the flow path 13 in the axial direction. Specifically, each seal ring 15 is configured to reduce the oil leakage from the clearance 14 in case the oil temperature is lower than normal temperature, and to discharge the oil to the outside in case the oil temperature is high. In order to hold the seal ring 15 on the outer circumferential face of the input shaft 5, holding grooves 16 are formed around the input shaft 5. Therefore, the each seal ring 15 is fitted onto the input shaft 5 in the holding groove 16, and the housing 6 is fitted onto the seal rings 15. In addition, an outer diameter of the seal ring 15 is slightly larger than an inner diameter of the cylindrical portion 6a of the housing 6. Therefore, after the input shaft 5 is thus inserted into the cylindrical portion 6a of the housing 6 through the seal rings 15, an outer circumferential face of the seal ring 15 is pushed onto an inner circumferential face of the cylindrical portion 6a by an elastic force thereof.

Figure 1:
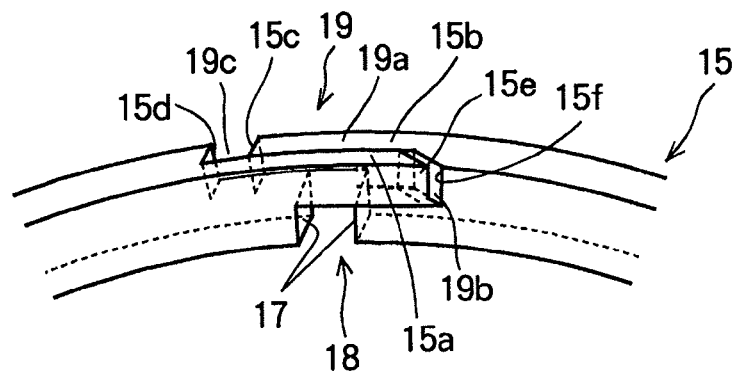
FIG. 1 is a perspective view showing a first example of the sealing structure according to the present invention.

Here will be explained a first example of the sealing structure of the present invention in more details. FIGS. 1 to 6 are explanation drawings showing the first example of the sealing structure according to the present invention. Specifically, the sealing structure of the present invention is configured to prevent the oil leakage by sealing the clearance 14 between the input shaft 5 and the housing 6 in case a temperature of the seal ring 15 is lower than a normal temperature, and to allow the oil to leak out of an after-mentioned cut 19 through between cut ends 17 of the seal ring 15. Next, a structure of the seal ring 15 will be explained in more details with reference to FIGS. 1 to 6. As shown in FIG. 1, a groove 18 is formed between the cut ends 17 in a direction to penetrate through an inner circumferential side of the seal ring 15 in the axial direction. Specifically, a sufficient clearance is kept between the cut ends 17 being opposed to each other so that the cut ends 17 will not be contacted with each other even in case the seal ring 15 is thermally expanded. An outer circumferential end of the groove 18 is situated in an inner circumferential side of the clearance 14 between the input shaft 5 and the housing 6, under the situation in which the housing 6 is fitted onto the seal ring 15 held in the holding groove 16 of the input shaft 5. Therefore, the groove 18 is closed by an inner side wall of the holding groove 16 contacted thereto.

Figure 2:
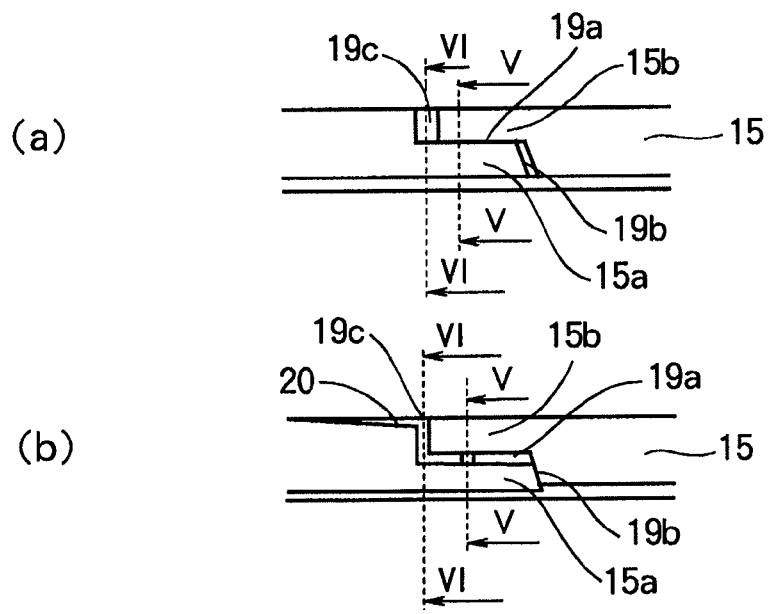
FIG. 2 is a view showing an outer circumferential face of the seal ring.
Figure 3:
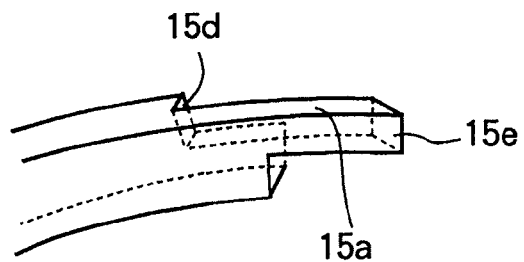
FIG. 3 is a perspective view showing a configuration of one of the slidable piece.
Figure 4:
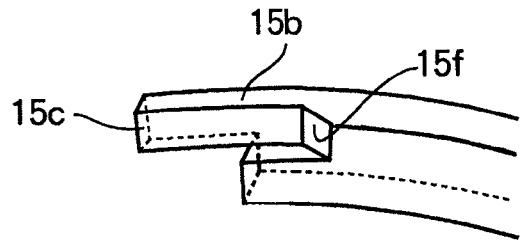
FIG. 4 is a perspective view showing a configuration of the other slidable piece.

The seal ring 15 is cleaved in the axial direction by the cut 19 cutting an outer circumferential portion of the seal ring 15 in a zigzag manner. Specifically, as shown in FIG. 2, the cut 19 comprises a first cut 19a cutting the outer circumferential face of the seal ring 15 partially in the length direction; a second cut 19b cutting the seal ring 15 from one of leading ends of the first cut 19a toward the flow path 13 allowing the oil to be supplied to the hydraulic chamber 11 (i.e., toward a high pressure side); and a third cut 19c cutting the seal ring 15 from the other leading end of the first cut 19a toward the other width end of the seal ring 15 from which the oil is discharged (i.e., toward a low pressure side). Thus, as shown in FIGS. 3 and 4, the seal ring 15 is partially divided lengthwise by the cut 19 into a slidable piece 15a and a slidable piece 15b extending in a predetermined length in opposite directions. An outer circumferential face of the seal ring 15 thus structured under the normal temperature is shown in FIG. 2(a). As shown in FIG. 2(a), a sufficient distance is maintained in a clearance created by the third cut 19c between a leading end face 15c of the slidable piece 15b in the low pressure side and an end face 15d opposed thereto. Therefore, the leading end face 15c and the end face 15d will not be contacted with each other even in case the seal ring 15 is thermally expanded. Meanwhile, a clearance created by the second cut 19b is narrower than the clearance created by the third cut 19c. Therefore, a leading end face 15e of the slidable piece 15a in the high pressure side and an end face 15f opposed thereto will be contacted and push each other in case the seal ring 15 is thermally expanded. Here, both of the leading end face 15e and the end face 15f are inclined in a manner to produce a component of the pushing force between those end faces 15e and 15f in a direction to slide the slidable piece 15a of the high pressure side toward the high pressure side. Therefore, in case the seal ring 15 is elongated by a thermal expansion thereof, the slidable piece 15a is moved away from the other slidable piece 15b as shown in FIG. 2 (b).

Figure 5:
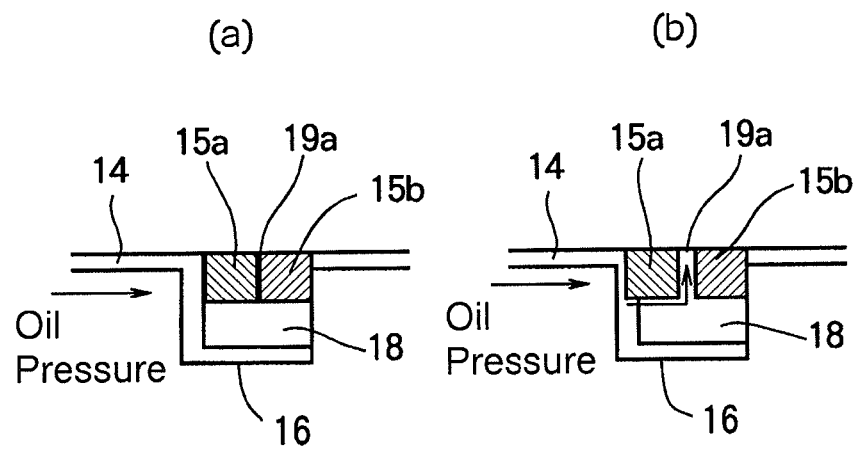
FIG. 5 is a sectional view showing a section V-V in FIG. 2.
Figure 6:
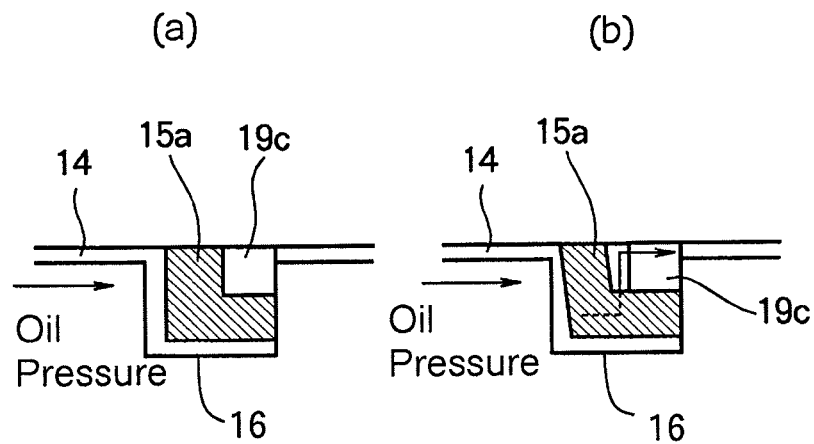
FIG. 6 is a sectional view showing a section VI-VI in FIG. 2.

Next, an action of the seal ring 15 thus structured will be explained hereinafter. FIG. 5 is a sectional view showing a section V-V shown in FIG. 2. In FIG. 5, FIG. 5(a) indicates a situation in which a temperature of the seal ring 15 is normal, and FIG. 5(b) indicates a situation in which a temperature of the seal ring 15 is high. FIG. 6 is a sectional view showing a section VI-VI shown in FIG. 2. In FIG. 6, FIG. 6(a) indicates a situation in which a temperature of the seal ring 15 is normal, and FIG. 6(b) indicates a situation in which a temperature of the seal ring 15 is high. Here, each arrow in FIGS. 5 and 6 represent a flow direction of the oil. As shown in FIGS. 5 and 6, one of the lateral faces of the seal ring 15 facing to the flow path 13 is contacted with the oil held in the clearance 14 between the seal rings 15 fitted onto the input shaft 5. Therefore, the temperature of the seal ring is changed by the temperature of the oil transmitted thereto. In this situation, the each seal ring 15 is pushed onto one of inner walls of the holding groove 16 by the pressure of the oil held in the clearance 14 between the seal rings 15. In other words, the oil pressure is applied to the seal ring 15 from the aforementioned high pressure side and the seal ring 15 is thereby pushed onto one of inner walls of the holding groove 16 of the low pressure side. Therefore, in case the temperature of the seal ring 15 is lower than the normal temperature, that is, in case the oil temperature is lower than the normal temperature, the outer circumferential face of the seal ring 15 is contacted with the inner circumferential face of the cylindrical portion of the housing 6 by the elastic force of the seal ring 15, and the other lateral face of the seal ring 15, that is, the lateral face of the seal ring 15 of the low pressure side is pushed onto the inner side wall of the holding groove 16 by the oil pressure. In this situation, the slidable piece 15a is contacted with the slidable piece 15b. Therefore, in this case, the clearance 14 between the input shaft 5 and the housing 6 is sealed liquid-tightly by the seal rings 15.

In case the temperature of the seal ring 15 is high, that is, in case the temperature of the oil is high, the seal ring 15 is expanded thermally. In this case, therefore, the leading end face 15e of the slidable piece 15a in the high pressure side and the end face 15f opposed thereto are contacted and push each other. As a result, the movable piece 15a slides toward the high pressure. That is, the seal ring 15 is twisted by a torsional load. Specifically, as shown in FIG. 5(b), the slidable piece 15a is moved away from the slidable piece 15b and the first cut 19a is thereby opened. In this situation, the oil in the high pressure side of the clearance 14 between the seal rings 15 is allowed to be discharged to the low pressure side of the clearance 14 through the groove 18 of the inner circumferential side of the seal ring 15, the first cut 19a and the third cut 19c. Thus, the oil is allowed to flow in this case. Therefore, an excessive temperature rise of the oil can be prevented so that the oil is prevented from being deteriorated. In addition, in case the seal ring 15 is thus expanded thermally, not only the slidable piece 15a but also the entire seal ring 15 is twisted. As a result, the seal ring 15 is partially isolated from the holding groove 16 of the input shaft 5 in the vicinity of the third cut 19c thereby creating a clearance 20. In this case, therefore, the oil in the high pressure side can also be discharged to the low pressure side from the clearance 20 thus created.

Figure 7:
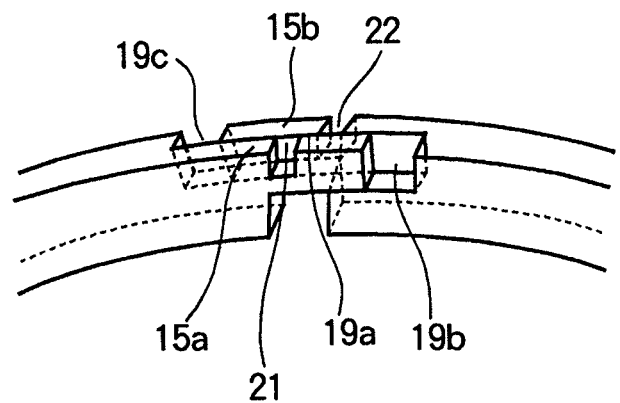
FIG. 7 is a perspective view showing a second example of the sealing structure according to the present invention.

Here will be explained a second example of the sealing structure according to the present invention. FIG. 7 is a view showing the second example of the sealing structure according to the present invention, and fundamental structure of this example is identical to that of the above-explained first example. As shown in FIG. 7, according to the second example, an outer groove 21 having a predetermined depth is formed on the outer circumferential portion of the slidable portion 15a, and an outer groove 22 having a predetermined depth is formed on the outer circumferential portion of the slidable portion 15b. However, according to the second example, the clearance between the leading end face 15e of the slidable piece 15a and the end face 15f opposed thereto is wider than that of the seal ring 15 according to the first example. Therefore, the leading end face 15e and the end face 15f will not be contacted with each other even in case the seal ring 15 is thermally expanded. Specifically, according to the second example, the outer groove 21 of the slidable piece 15a and the outer groove 22 of the slidable piece 15b are displaced away from each other in the circumferential direction to be disconnected in case the temperature of the seal ring 15 is low. However, in case the seal ring 15 is thermally expanded, the outer groove 21 and the outer groove 22 are aligned in the circumferential direction thereby forming a flow path in the axial direction. Thus, according to the second example, the oil held in the clearance 14 between the seal rings 15 can be discharged from the flow path formed by the grooves 21 and 22 in case the seal ring 15 is thermally expanded. Therefore, an excessive temperature rise of the oil can be prevented by thus flowing the oil so that the oil is prevented from being deteriorated.

The sealing structure according to the present invention should not be limited to the examples thus have been explained. In short, fundamental roles of the seal ring 15 are to seal the oil in case the temperature thereof is low, and to discharge the oil by the thermal expansion thereof resulting from a temperature rise. Therefore, the seal ring 15 may be applied not only to the rotary member such as the input shaft 5 but also to a member whose rotational movement is restricted. In addition, in the above-explained examples, the present invention is applied to the seal ring adapted to prevent an oil leak, however, the present invention may also be applied to a seal ring for preventing a leakage of air or liquid.

The invention claimed is:

1. A sealing structure for sealing a clearance between two members liquid-tightly or air-tightly by a seal ring interposed therebetween:
the seal ring comprises a slidable structure, which is configured to seal the clearance between the two members by a hydraulic pressure applied thereto, and to unseal the clearance between the two members by a relative movement thereof resulting from a thermal expansion thereof;
wherein the slidable structure comprises
a pair of slidable pieces arranged adjacent to each other in a width direction of the seal ring while being allowed to slide relatively in counter directions, each of the slidable pieces including a protruding portion and a recessed portion, the recessed portion including a circumferentially extending surface, an axially facing surface and a receiving face, and the protruding portion including a leading end face; and
a guiding structure, which is configured to guide one of the slidable pieces in a direction away from the other slidable piece when the slidable pieces move ahead relatively as a result of thermal expansion of the seal ring; and
wherein the seal ring further comprises a pair of openings opened between the slidable pieces when said one of the slidable pieces is isolated away from the other slidable piece;
the leading end face of the one of the slidable pieces and the receiving face, the circumferentially extending surface, and the axially facing surface of the other slidable piece forming one of the pair of openings, the guiding structure comprises an inclined face formed on the leading end face of said one of the slidable pieces and an inclined face formed on the receiving face of the other slidable piece such that the inclined faces are opposed to one another with respect to the one of the pair of openings, the inclined faces being inclined with respect to a direction perpendicular to the axial direction, thereby producing an outward component of a pushing force between the inclined faces resulting from the thermal expansion of the seal ring in a width direction of the seal ring, the one of the slidable pieces being pushed axially away from the other slidable piece when the inclined faces contact one another.

2. The sealing structure as claimed in claim 1, further comprising:

the two members that hold the seal ring therein; and a holding groove formed on one of the two members; and wherein the clearance between the two members is sealed by contacting the seal ring held in the holding groove with the other member while pushing the seal ring onto one of inner faces of the holding groove by a hydraulic pressure.

3. The sealing structure as claimed in claim 2, wherein the seal ring is configured to seal the clearance between the two members by being contacted with each of the two members, and wherein the slidable structure is configured to create a clearance by partially isolating the seal ring from said one of two members.

4. The sealing structure as claimed in claim 1, wherein a distance of a clearance between the leading end face of said other slidable piece and the receiving face of the one of the slidable pieces do not contact each other even when the inclined faces contact each other.

5. The sealing structure as claimed in claim 2, wherein a distance of a clearance between the leading end face of said other slidable piece and the receiving face of the one of the slidable pieces do not contact each other even when the inclined faces contact each other.

6. The sealing structure as claimed in claim 3, wherein a distance of a clearance between the leading end face of said other slidable piece and the receiving face of the one of the slidable pieces do not contact each other even when the inclined faces contact each other.

7. The sealing structure as claimed in claim 1, wherein each of the leading end face of the other slidable piece and the receiving face of the one of the slidable pieces face in a direction perpendicular to the axial direction.

8. The sealing structure as claimed in claim 7, wherein a distance of a clearance between the leading end face of said other slidable piece and the receiving face of the one of the slidable pieces do not contact each other even when the inclined faces contact each other.

* * * * *